May 12, 1942.    T. A. CUTTING    2,282,643
SPECTROMETER
Filed Oct. 25, 1940
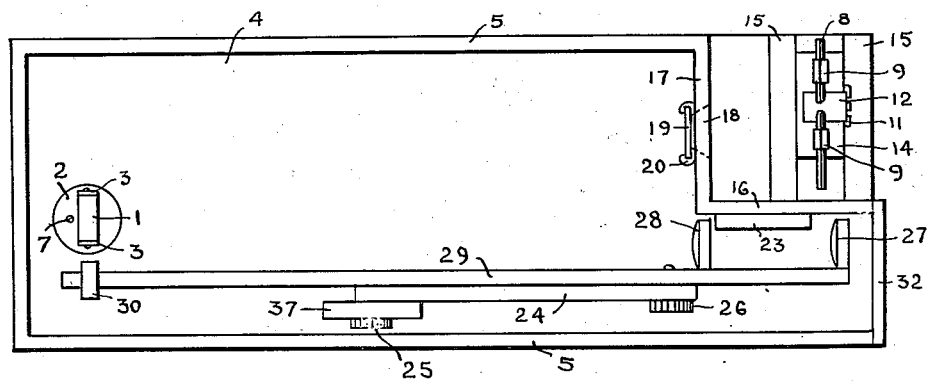
Fig. I.
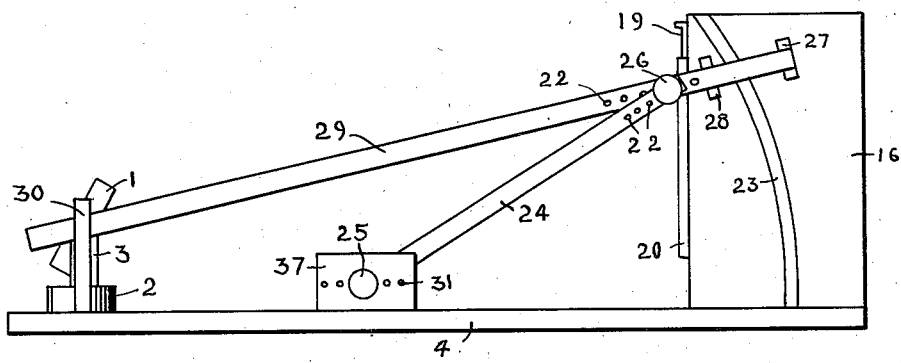
Fig. II.
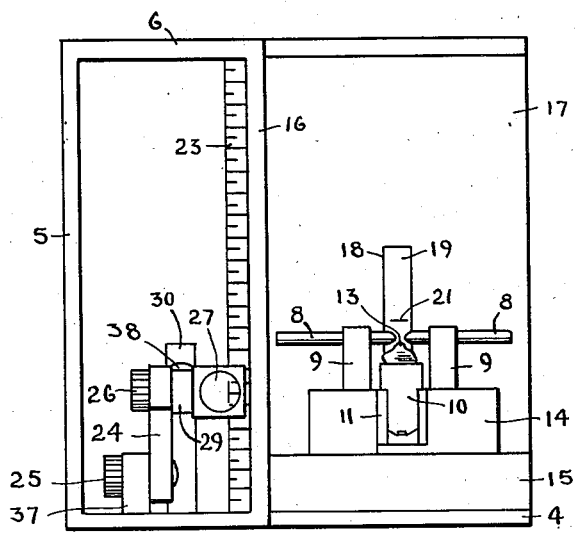
Fig. III.    Fig. IV.
INVENTOR
Theodore A. Cutting.

Patented May 12, 1942

2,282,643

UNITED STATES PATENT OFFICE 2,282,643

SPECTROMETER

Theodore A. Cutting, Campbell, Calif.

Application October 25, 1940, Serial No. 362,735

8 Claims. (Cl. 88—14)

My invention relates to improvements in spectroscopes and the object of my improvement is to provide a compact, reflecting, diffraction grating spectrometer and spectrograph with a horizontal slit and a vertically arranged scale. Further objects are to provide adjusting means for the reflecting grating, the eye lenses, and the arc, and to provide means for simultaneously viewing both spectrum and scale. Still further objects are to provide means for converting the spectrometer into a spectrograph and to provide a new type of diffration grating, combining grating, reflector, and magnifier. Still another object is to provide means for keeping the eye lenses in focus of the reflector and properly trained upon the diffraction grating as they move over the spectrum.

In the drawing:

Figure I is a plan view of the spectrometer, top removed,

Figure II is a side view with casing removed,

Figure III is an end view of the spectrometer, and

Figure IV a side view of the reflecting grating.

The spectrometer is provided with a reflecting diffraction grating 1, mounted upon a circular turntable 2 and pivotally held between standards 3 rising from turntable 2. The turntable, held by screw 7, is mounted upon the base 4 of the spectrometer.

The whole instrument may be enclosed by walls 5 and cover 6, with the exception of the square space in the corner occupied by the electric arc, the carbons 8 of which are arranged horizontally and secured by holders 9. The ore to be analyzed is placed upon a strip of metal whose lower portion 10 slides in track 11, and whose upper part 12 is bent at right angles to serve as a table upon which to burn the ore 13. Instead of packing the powdered rock into a hollow carbon, as is customary, a fragment is placed upon the table 12, which is then pushed up until the substance to be analyzed is directly beneath or in the arc.

Cover 6 does not extend over the arc, but is cut away at the corner to keep the arc open and cool. The arc is mounted upon a block 14, sliding between two guides 15 so that it may easily be aligned with slit 21 and grating 1. Light from the arc enters the casing through window 18 in wall 17, and a strip of glass 19, painted black, slides vertically in track 20 over window 18. A fine line scratched in the paint may constitute the spectroscopic slit 21. The strip is pushed down until the slit 21 registers with window 18 and directs a beam of light from the arc upon grating 1.

This beam of light may be reflected up or down by rotating the mirrored grating 1 between the supporting standards 3, and may be reflected to left or right by moving turntable 2 about screw 7. After reflection from the grating, part of this beam of light becomes the spectrum of the substance being burned in the arc, and the grating is turned so as to bring the spectrum directly alongside the scale 23.

Scale 23, attached to wall 16, and curved in an arc, is calibrated directly in Angstrom units so that the observer may instantly read the wave length of any spectral line by looking through the eye lens 27 and noting both spectrum and scale simultaneously. The eye lens 27 and the field lens 28 are mounted upon a rod 29, sliding at one end in a hole 38 in standard 30, and bolted at the other end to rod 24. Scale 23 is magnified by the eye lens 27 and lies between lenses 27 and 28. When the free end of rod 29 is raised, as in Figure II, lines at one end of the spectrum appear; when the rod with its lenses is lowered, as shown in Fig. III, lines at the opposite end of the spectrum appear. The whole visible spectrum passes in review as the eye lens swings in an arc with its center at bolt 25. The field lens 28 is placed at less than its focal length from the eye lens 27, and it serves to bring more spectral lines into view at one time than when eye lens 27 alone is used. The lens 28 is not absolutely essential to the instrument, and may be made slidable upon rod 29 for focusing, or may even be dispensed with.

It has been found that an eye lens, to produce clearly focused lines at all points of the spectrum produced by the combination reflecting and magnifying grating must move in an arc of a circle having a radius equal to about one half of the distance between slit and grating. Rod 24, therefore, is given this length and anchored at one end to the block 37, midway between slit and grating. Rod 29 is bolted to rod 24 by a bolt with a thumb-nut 26, and so the lenses carried by it are made to swing in the desired arc. Since the opposite end of rod 29 slides in a hole 38 in standard 30, near the grating, the lenses are kept in constant alignment with the grating 1.

For converting the spectrometer into a spectrograph a photographic film is attached to the rear of scale 23, rod 29 is lowered or removed, and end wall 32 applied to exclude all light from the instrument except that entering through the slit 21 from the arc.

Burning the chemical upon a table beneath the points of the carbons necessitates the horizontal arrangement of the carbons and slit, and the vertical arrangement of the scale or film with a resulting saving in table space. The arc of the scale is concentric with that of the movement of the eye lens 27, and hence the scale 23 is always in focus when once properly adjusted.

By tightening thumb nuts 25 and 26 sufficient joint friction is caused to keep arm 29 at any desired position without preventing its freedom of movement. Bolt holes 22 and 31 permit adjustments for securing proper distances between lenses and grating.

The reflector 1 is a combination unit consisting of a plano-convex lens 36, a diffraction grating 33 upon its plane side, a reflecting medium 34 backing the grating, and a protective coating 35 of paint or shellac at the back. The diffraction grating 33 may consist of actual rulings upon the plane surface of the lens 36 or of a replica grating attached to the plane surface. The reflecting surface 34 may be a coating of silver, aluminum, or other reflecting material. Of course the conventional concave diffraction grating may also be used in this spectrometer with no other change than its substitution for the unit herein described.

Light rays striking the reflector unit 1, passing through to the reflector and back again will be twice refracted as by a double convex lens and will yield a magnified image similar to that of a concave mirror. The focal length of the unit will depend upon the convexity of the lens. The unit will consequently yield a magnified spectrum similar to that produced by a concave reflecting diffraction grating.

I claim:

1. A spectrometer having a casing, a slit at one end of said casing, a reflecting diffraction grating at the other end of said casing, a standard near said grating, a hole in said standard, a rod with one end slidably engaged in said hole and loosely enough held to permit also vertical pivotal movement and with a free end near said slit, an eye lens mounted upon the free end of said rod for viewing the spectrum produced by said grating, a field lens between said eye lens and said grating also mounted upon said rod, a block attached to the base of said casing midway between said slit and said grating, an arm pivotally bolted at one end to said block to permit vertical movement and pivotally bolted at the other end to the free end of said rod to cause said eye lens to move in an arc, and an arcuate scale concentric with the arc of movement of said eye lens and in the focus of said eye lens but occupying only a portion of the field of the eye lens, the spectrum occupying the remainder of the field, the scale calibrated and positioned to indicate what portion of the spectrum is visible through the lens.

2. A spectrometer having a casing, a window in the end wall of said casing, a slide covering said window, a slit in said slide to admit a flattened beam of light to said casing, a plano convex lens at the opposite end of said casing receiving light from said slit, a diffraction grating attached to the plane side of said lens, a mirrored surface backing said grating, a standard near said grating, a rod slidably and pivotally attached to said standard at the level of said grating and with its free end near said slit, an eye lens mounted upon the free end of said rod for viewing the spectrum produced by said grating, an arm pivotally attached to the base of said casing approximately midway between said slit and said grating and pivotally attached at the opposite end to said rod near the eye lens and causing said eye lens to move in the arc of focus of said grating, and an arcuate scale concentric with the arc of movement of said eye lens occupying a portion of the field of the lens with the spectrum occupying the remainder of the field, the scale calibrated and positioned to indicate the portion of the spectrum visible through the lens.

3. The combination of a base, an arc with horizontally arranged carbons mounted upon a corner of said base, a reflecting diffraction grating mounted upon the opposite end of said base, a wall between said arc and said grating, a horizontal slit in said wall for passing light from said arc to said grating, an eye lens at one side of said arc, a partition between said arc and said eye lens, a rod with one end slidably and pivotally supported at the level of said grating and the other end supporting said eye lens and training it upon said grating, and an arm pivotally attached at one end to the base approximately midway between said slit and said grating and pivoted at the other end to said lens rod to impart to its free end an arcuate movement for keeping the spectrum in focus as the eye lens moves up and down in the path of the spectrum.

4. A spectrometer having a base, a wall rising from said base, a slit in said wall; a magnifying, reflecting, diffraction grating receiving light from said slit; an eye lens in the path of the spectrum reflected from said grating, a rod slidingly and pivotally engaged at one end near said grating and supporting at the free end said eye lens; an arm pivoted at one end to said base, approximately midway between said slit and said grating, so as to permit vertical rotation, and pivotally bolted at the other end to said rod near the eye lens, thereby causing said eye lens to move in an arc; bolts at both ends of said arm to permit vertical pivotal movement, a wavelength scale concentric with the path of movement of said eye lens and in the focus of said eye lens, extra bolt holes in said rod and said arm to permit focal adjustments, and wing nuts upon the bolts holding said arm and said rod for the regulation of friction so that the eye lens may be moved up or down, but yet remain fixed at any desired position.

5. A combination spectrometer and spectrograph having a casing, a horizontal slit in said casing, a diffraction grating with horizontal rulings receiving the beam of light from said slit, a lens for magnifying the spectrum produced by said grating, an eye lens at the focus of said magnifying lens for viewing the spectrum, means for moving said eye lens for viewing different parts of the spectrum, supporting means concentric with the path of movement of said eye lens and between part of said eye lens and said grating, for holding on one side a scale and upon the other a photographic film, and means for excluding from the casing all light except that entering the slit.

6. A spectroscope having a base, a wall rising from said base, a slit in said wall, a plano-convex lens receiving the beam of light from said slit, a diffraction grating upon the plane side of said lens, a mirrored surface backing said grating, an upright attached to said base near said grating, a rod slidably and pivotally engaged at one end by said upright at a point on a level with said grating and free at the other end for vertical movement, an eye lens at the free end of said rod, a block attached to said base approximately midway between said eye lens and said grating, an arm pivotally attached at one end to said rod near said eye lens and at the other to said block and causing the end of said rod with its lens to move in an arc, and a plurality of perforations in said block for adjustment of the arm attached thereto.

7. A spectroscope having a base, a wall at one end of said base, a slit in said wall, a reflecting light dispersing means at the other end of said base receiving light from said slit, a member with one end slidably and pivotally supported near said dispersing means, an ocular mounted at the opposite end of said member receiving the spectrum reflected from said light dispersing means, and an arm pivotally attached at one end to said base approximately midway between said ocular and said dispersing means and pivoted at the other end to said member near said ocular for imparting an arcuate movement to said ocular.

8. A combination spectrometer and spectrograph having a casing, a slit at one end of said casing, a reflecting light dispersing means at the opposite end of said casing receiving light from said slit, an ocular to one side of said slit receiving the spectrum reflected from said dispersing means, means for moving said ocular to different portions of the spectrum, supporting means concentric with the path of movement of said ocular and between part of said ocular and said dispersing means for holding on one side a scale and upon the other a spectrographic film.

THEODORE A. CUTTING.